US012306343B2

(12) United States Patent
Kimura et al.

(10) Patent No.: US 12,306,343 B2
(45) Date of Patent: May 20, 2025

(54) OPTICAL INTERFERENCE MEASUREMENT APPARATUS HAVING OPTICAL PATH LENGTHS SET TO SATISFY A GIVEN RELATION

(71) Applicant: OMRON Corporation, Kyoto (JP)

(72) Inventors: Kazuya Kimura, Kizugawa (JP); Masayuki Hayakawa, Kizugawa (JP); Hisayasu Morino, Fukuchiyama (JP); Yusuke Nagasaki, Soraku-gun (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/170,942

(22) Filed: Feb. 9, 2021

(65) Prior Publication Data

US 2021/0286055 A1    Sep. 16, 2021

(30) Foreign Application Priority Data

Mar. 12, 2020   (JP) ................... 2020-042765

(51) Int. Cl.
  *G01S 7/48*     (2006.01)
  *G01S 7/481*    (2006.01)
  *G01S 17/32*    (2020.01)

(52) U.S. Cl.
  CPC ............ *G01S 7/4818* (2013.01); *G01S 17/32* (2013.01)

(58) Field of Classification Search
  CPC ... G01S 7/4818; G01S 17/32; G01B 9/02028; G01B 9/0205; G01B 9/02057; G01B 9/0209; G01B 9/02016
  See application file for complete search history.

(56) References Cited

U.S. PATENT DOCUMENTS

2006/0152734 A1*  7/2006  Suzuki ............... G01B 11/0675
                                                        356/479
2008/0144040 A1   6/2008  Drabarek
(Continued)

FOREIGN PATENT DOCUMENTS

EP      3401634 A1     6/2008
JP      2010-276462 A  12/2010
JP      2016-147042 A  8/2016

OTHER PUBLICATIONS

The extended European search report (EESR) issued on Jun. 28, 2021 in a counterpart European patent application.
(Continued)

*Primary Examiner* — Hwa Andrew Lee
(74) *Attorney, Agent, or Firm* — ALEX IP LAW GROUP, PLLC; Robert L. Scoff, Esq.

(57) ABSTRACT

In one or more embodiments of an optical interference measurement apparatus, first return light received by a first measurement head is guided to a detector via a first optical path and a fiber coupler. Second return light received by a second measurement head is guided to the detector via a second optical path and the fiber coupler. Optical path lengths D1 and D2 from the fiber coupler to a leading end of the first measurement head and a leading end of the second measurement head respectively, a maximum optical path length R1 max of the measurement range of the first measurement head, optical path lengths S1 and S2 of the first reference light that interferes with the first return light and of the second reference light that interferes with the second return light respectively are set such that the relation D1+R1 max−S1<D2−S2 is satisfied.

10 Claims, 10 Drawing Sheets

(56) References Cited

U.S. PATENT DOCUMENTS

| | | |
|---|---|---|
| 2008/0218744 A1* | 9/2008 | Abe ................. G01K 11/125 356/73 |
| 2012/0063486 A1* | 3/2012 | Yamawaku ............ G01K 11/12 374/120 |
| 2015/0176969 A1 | 6/2015 | Jensen |
| 2016/0235361 A1 | 8/2016 | Lee et al. |
| 2019/0120608 A1 | 4/2019 | Kennedy |
| 2020/0200523 A1 | 6/2020 | Am Weg et al. |

OTHER PUBLICATIONS

The Chinese Office Action issued on Mar. 2, 2023 in a counterpart Chinese patent application.
The Japanese Office Action issued on Sep. 5, 2023 in a counterpart Japanese patent application.

* cited by examiner

OPTICAL INTERFERENCE MEASUREMENT APPARATUS HAVING OPTICAL PATH LENGTHS SET TO SATISFY A GIVEN RELATION

CROSS-REFERENCES TO RELATED APPLICATIONS

This application claims priority to Japanese Patent Application No. 2020-042765 filed Mar. 12, 2020, the entire contents of which are incorporated herein by reference.

FIELD

The disclosure relates to a ranging technique using optical interference.

BACKGROUND

A technique is known in which a measurement object is irradiated with coherent measurement light, and a distance, a speed, an oscillation, and the like are measured based on interference signals of reflected light (return light) and reference light. JP 2010-276462A proposes a configuration in which, in an OCT (optical coherence tomography) apparatus, measurement light output from one light source is branched into N light beams, and measurement is performed by using N optical systems in parallel.

JP 2010-276462A is an example of background art.

There is a high demand for multi-channel measurement apparatuses which can measure a plurality of measurement objects at the same time. However, in the configuration in which optical components for providing the reference light, a detector, an analog-to-digital (A/D) converter, and the like are provided for each channel, such as in the apparatus disclosed in JP 2010-276462A, the number of components increases N-fold, which incurs problems such as an increase in size of the apparatus, complication of the structure, an increase in costs, and the like, and thus such a configuration is impracticable.

The disclosed invention has been made in view of the above circumstances, and aims to provide a multi-channel optical interference measurement apparatus at low cost without incurring an increase in size of the apparatus.

SUMMARY

An optical interference measurement apparatus according to one or more embodiments may include a light source that is configured to output measurement light, a measurement unit that is configured to emit the measurement light and to receive return light that is reflected from a measurement object, a detector that is configured to receive an interference signal of the return light and reference light and to convert the interference signal into an electric signal and a processing unit that is configured to obtain information relating to a distance, a speed, or an oscillation of the measurement object, based on the electric signal, and a fiber coupler that branches the measurement light from the light source is provided on an optical path between the light source and the measurement unit, the measurement unit may include a first measurement head to which a first measurement light branched from the fiber coupler is input via a first optical path, and a second measurement head to which a second measurement light branched from the fiber coupler is input via a second optical path, a first return light that is received by the first measurement head is guided to the detector via the first optical path and the fiber coupler, a second return light that is received by the second measurement head is guided to the detector via the second optical path and the fiber coupler, an optical path length $D1$ from the fiber coupler to the leading end of the first measurement head, an optical path length $D2$ from the fiber coupler to the leading end of the second measurement head, a maximum optical path length $R1$ max of the measurement range of the first measurement head, an optical path length $S1$ of the first reference light that interferes with the first return light, and an optical path length $S2$ of the second reference light that interferes with the second return light are set such that relation (1):

$$D1+R1\,\text{max}-S1<D2-S2 \tag{1}$$

is satisfied.

With the above described configuration, the first measurement head and the second measurement head may share the configuration (light source, detector, and processing unit) upstream of the fiber coupler. In other words, a pair of light sources and signal processing systems may enable multi-channel measurement using the plurality of measurement heads. Furthermore, since the optical path length of the measurement system of the first measurement head and the optical path length of the measurement system of the second measurement head may be set such that the above relational expression (1) is satisfied, in the frequency spectrum of the interference signal, a first frequency range corresponding to the measurement range of the first measurement head and a second frequency range corresponding to a measurement range of the second measurement head are completely separate from each other, which may make it easy to extract the ranging results of the measurement heads from the frequency spectrum of one interference signal.

A configuration may also be possible in which the first reference light is part of the first measurement light that is reflected from a first reference surface provided on the first optical path, and the second reference light is part of the second measurement light that is reflected from a second reference surface provided on the second optical path. With the above described configuration, since the optical paths of the reference light and the return light may be the same, the influence of temperature changes and oscillations can be offset, and robustness can be improved. In this configuration, it may be preferable that an optical path length $D1'$ from the first reference surface to the leading end of the first measurement head and an optical path length $D2'$ from the second reference surface to the leading end of the second measurement head are set such that the relation (2):

$$D1'+R1\,\text{max}<D2' \tag{2}$$

is satisfied. Furthermore, the first reference surface may also be arranged at a connection portion of the first optical path and the first measurement head. Furthermore, the first reference surface may also be an end face on the first measurement head side of an optical fiber that forms the first optical path. Furthermore, the second reference surface may also be arranged at an intermediate portion of the second optical path. A configuration is also possible in which, for example, the second optical path is formed by coupling a first optical fiber and a second optical fiber, and the second reference surface is an end face on the second optical fiber side of the first optical fiber.

An optical path of the first reference light and an optical path of the second reference light may also be the same. In this configuration, it may be preferable that the optical path length $D1$ from the fiber coupler to the leading end of the first measurement head and the optical path length D2 from the fiber coupler to the leading end of the second measurement head are set such that the relation (3):

$$D1 + R1_{max} < D2 \qquad (3)$$

is satisfied.

It may be preferable that an optical isolator that prevents light from entering to the light source is provided between the light source and the fiber coupler. With this configuration, since the return light and the interference signal are prevented from entering to the light source via the fiber coupler, noise can be suppressed, and measurement accuracy can be improved.

A configuration is also possible in which the processing unit calculates the distance based on a frequency of a peak of a frequency spectrum of the interference signal, calculates a measurement distance measured by the first measurement head based on a frequency of a peak that is present within a first frequency range, and calculates a measurement distance measured by the second measurement head based on a frequency of a peak that is present within a second frequency range that does not overlap with the first frequency range.

The processing unit may also output an error if there are two peaks within the second frequency range. With this configuration, since an erroneous measurement result can be prevented from being output, reliability of the optical interference measurement apparatus can be improved.

One or more embodiments may be implemented as an optical interference measurement apparatus, a distance measurement apparatus, a ranging sensor, and the like including at least part of the above configuration. Note that each of the above means and processes can be combined with each other to the extent possible to constitute the present invention.

According to one or more embodiments, it may be possible to provide a multi-channel optical interference measurement apparatus at low cost without incurring an increase in size of the apparatus.

DETAILED DESCRIPTION

Application Example

Figure 1:
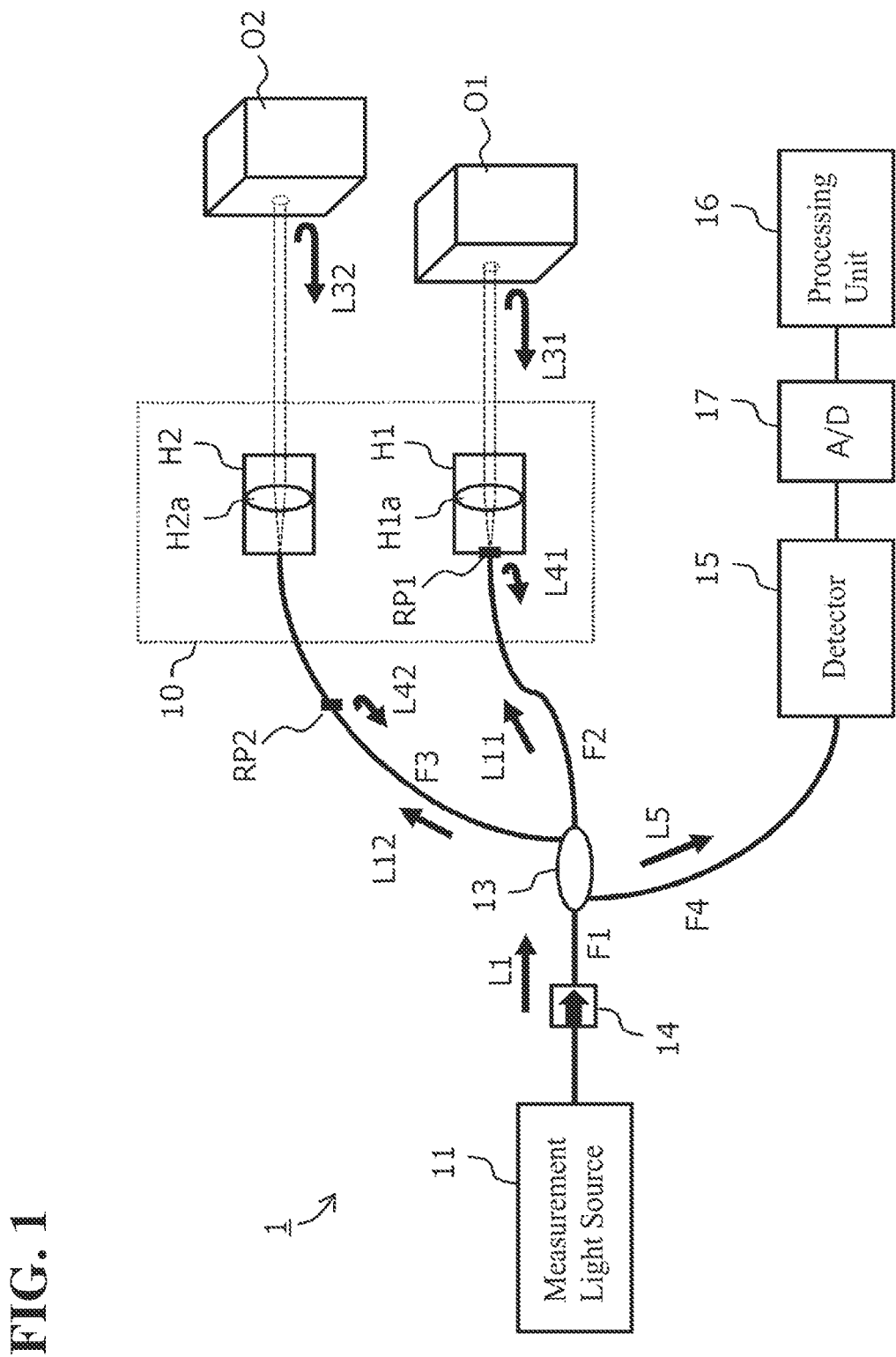
FIG. 1 is a schematic diagram illustrating a basic configuration of an optical interference measurement apparatus.

Hereinafter, an example of a basic configuration and operations of an optical interference measurement apparatus according to one or more embodiments is described with reference to FIG. 1.

An optical interference measurement apparatus 1 is an apparatus for measuring distance, speed, or oscillation of a measurement object by using an optical interference. The optical interference measurement apparatus 1 is constituted mainly including a measurement unit 10, a measurement light source 11 for outputting measurement light L1, a fiber coupler 13, an optical isolator 14, a detector 15, a processing unit 16, an A/D converter 17, and optical fibers F1 to F4. The measurement unit 10 includes a plurality of measurement heads that can independently perform measurement (irradiation with measurement light and reception of return light). Although two measurement heads, namely, a first measurement head H1 and a second measurement head H2 are provided as an example in FIG. 1, three or more measurement heads may also be provided. Also, although a Fizeau interferometer is used as an example in FIG. 1, other interferometers may be used, such as a Mach-Zehnder interferometer or a Michelson interferometer.

The measurement light L1 output by the measurement light source 11 is input to the fiber coupler (branching device) 13 via the optical fiber F1, and is branched into first measurement light L11 and second measurement light L12. The first measurement light L11 is guided to the first measurement head H1 via the optical fiber (a first optical path) F2 and is projected from the first measurement head H1 to a measurement object O1. The second measurement light L12 is guided to the second measurement head H2 via the optical fiber (a second optical path) F3 and is projected from the second measurement head H2 toward a measurement object O2.

The light that is reflected from the measurement object O1 and received by the first measurement head H1 is guided to the optical fiber F2 as first return light L31. On the other hand, part of the first measurement light L11 is reflected from a first reference surface RP1 and guided to the optical fiber F2 as first reference light L41. The first return light L31 and the first reference light L41 interfere with each other on the first reference surface RP1, and an interference signal (beat signal) thereof is input to the fiber coupler 13.

The light that is reflected from the measurement object O2 and received by the second measurement head H2 is guided to the optical fiber F3 as second return light L32. On the other hand, part of the second measurement light L12 is reflected from a second reference surface RP2 and guided to the optical fiber F3 as second reference light L42. The second return light L32 and the second reference light L42 interfere with each other on a second reference surface RP2, and an interference signal (beat signal) thereof is input to the fiber coupler 13.

Figure 2A:
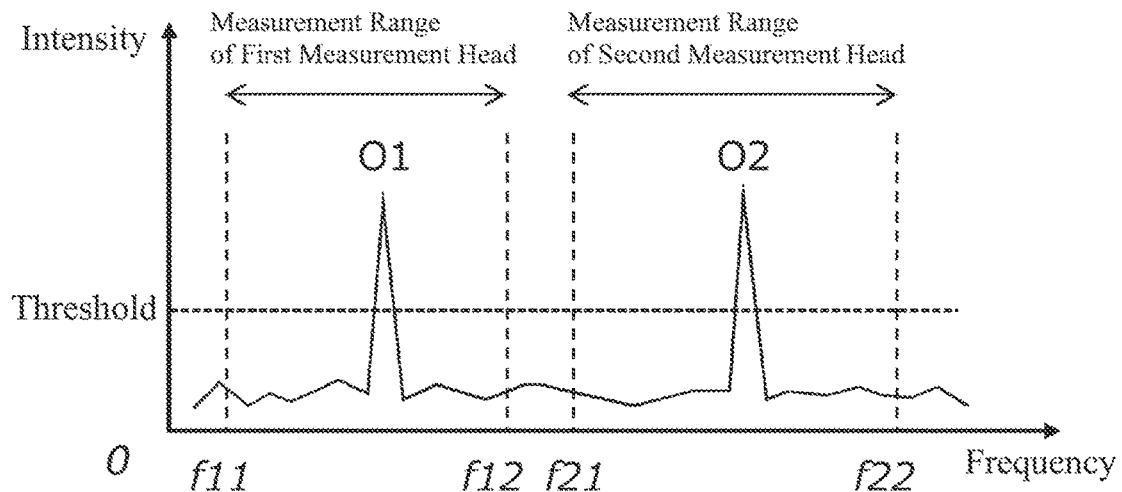
FIG. 2A is a diagram illustrating an example of a frequency spectrum of an interference signal.

The interference signal on the first measurement head H1 side and the interference signal on the second measurement head H2 side are combined with each other in the fiber coupler 13, and the resultant light beam is input to the detector 15 as an interference signal L5. This interference signal L5 is, after being subjected to a photoelectric conversion in the detector 15, input to the processing unit 16 via the A/D converter 17. The interference signal L5 includes both a frequency component corresponding to the difference in optical path length between the first return light L31 and the first reference light L41, that is, the distance to the measurement object O1, and a frequency component corresponding to the difference in optical path length between the second return light L32 and the second reference light L42, that is, the distance to the measurement object O2. FIG. 2A is an example of the frequency spectrum of the interference signal L5 (horizontal axis: frequency, vertical axis: intensity). It can be seen that peaks appear at frequencies corresponding to distances to the measurement object O1 and the measurement object O2. Accordingly, by performing frequency analysis on the interference signal L5 with the processing unit 16, information such as distance, speed, and oscillation of the measurement object O1 and the measurement object O2 can be obtained.

Setting of Optical Path Length

Here, when an optical path length from the fiber coupler 13 to the leading end of the first measurement head H1 is denoted by D1, an optical path length from the fiber coupler 13 to the leading end of the second measurement head H2 is denoted by D2, a maximum optical path length of the measurement range of the first measurement head H1 is denoted by R1 max, an optical path length of the first reference light L41 is denoted by S1, and an optical path length of the second reference light L42 is denoted by S2, the optical path lengths of the components are preferably set such that the relation (1):

$$D1+R1\ max-S1<D2-S2 \qquad (1)$$

is satisfied.

Note that "optical path length" is obtained by multiplying the refraction index by the distance by which the light actually travels, and is also called "optical distance". "Optical path length of the reference light" means the total optical path length of the reference light from where the reference light is emitted from the light source to where the reference light is combined with the return light, and the optical path length from the measurement light source 11 to the first reference surface RP1 corresponds to the optical path length of the first reference light L41 in FIG. 1, and the optical path length from the measurement light source 11 to the second reference surface RP2 corresponds to the optical path length of the second reference light L42. Also, "optical path length of the return light" means the total optical path length from where the measurement light is emitted from the light source to where the measurement light is combined with the reference light.

Figure 2B:
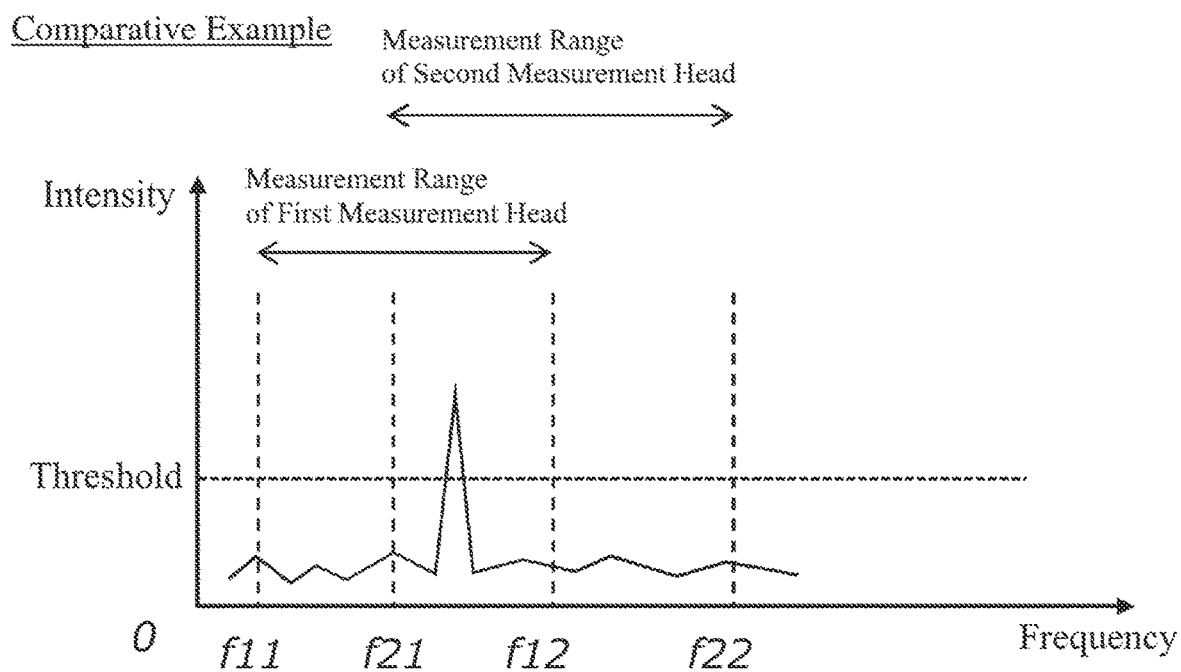
FIG. 2B is a diagram illustrating an example (comparative example) of a frequency spectrum of an interference signal in a case where a relational expression (1) is not satisfied.
Figure 3A:
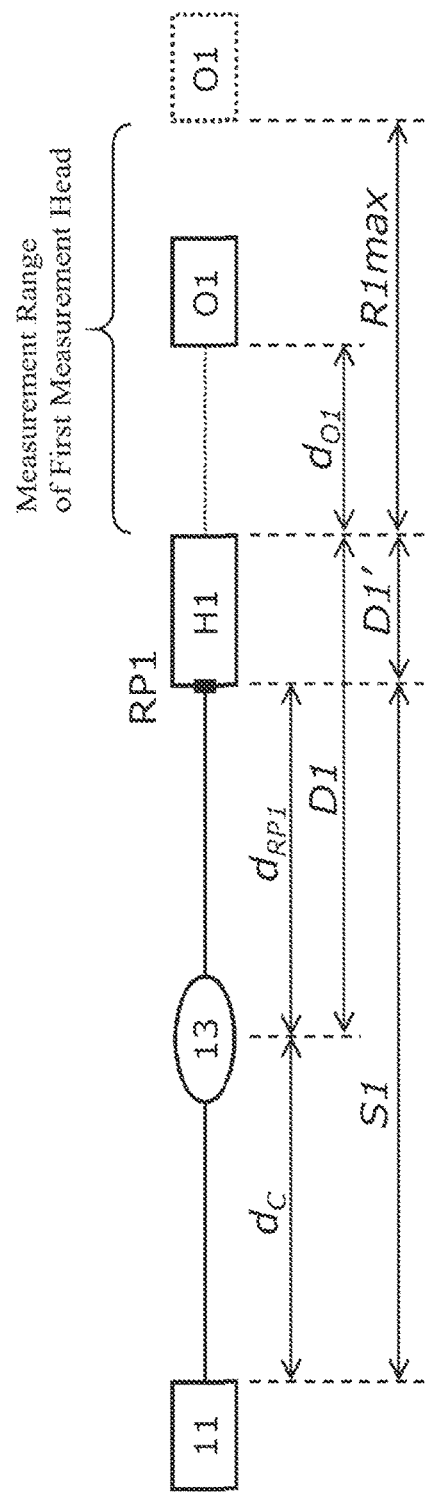
FIG. 3A is a diagram illustrating an optical path length relating to a measurement system of a first measurement head.
Figure 3B:
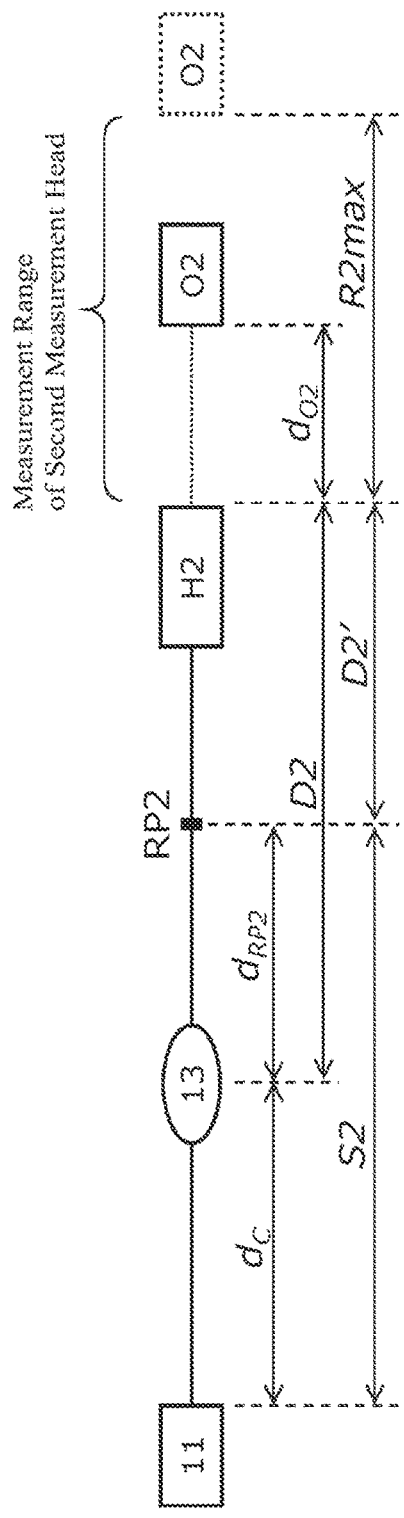
FIG. 3B is a diagram illustrating an optical path length relating to a measurement system of a second measurement head.

The meaning of the above relational expression (1) will be described with reference to FIG. 2A, FIG. 2B, FIG. 3A, and FIG. 3B. FIG. 2A is a diagram illustrating an example of the frequency spectrum of the interference signal L5, and FIG. 2B is a diagram illustrating an example (comparative example) of the frequency spectrum of the interference signal L5 when the relational expression (1) is not satisfied. FIG. 3A illustrates optical path lengths relating to the measurement system of the first measurement head H1, and FIG. 3B illustrates optical path lengths relating to the measurement system of the second measurement head H2.

In FIG. 2A and FIG. 2B, the letters and numerals in italics represent the following frequencies:

f11: frequency corresponding to the minimum optical path length in the measurement range of the first measurement head H1;

f12: frequency corresponding to the maximum optical path length in the measurement range of the first measurement head H1;

f21: frequency corresponding to the minimum optical path length in the measurement range of the second measurement head H2; and f22: frequency corresponding to the maximum optical path length in the measurement range of the second measurement head H2.

In FIG. 3A and FIG. 3B, the letters and numerals in italics represent the following optical path lengths:

D1: optical path length from the fiber coupler 13 to the leading end of the first measurement head H1;

D2: optical path length from the fiber coupler 13 to the leading end of the second measurement head H2;

S1: optical path length of the first reference light L41;

S2: optical path length of the second reference light L42;

D1': optical path length from the first reference surface RP1 to the leading end of the first measurement head H1;

D2': optical path length from the second reference surface RP2 to the leading end of the second measurement head H2;

R1 max: maximum optical path length of the measurement range of the first measurement head H1;

R2 max: maximum optical path length of the measurement range of the second measurement head H2;

$d_c$: optical path length from the measurement light source 11 to the fiber coupler 13;

$d_{RP1}$: optical path length from the fiber coupler 13 to the first reference surface RP1;

$d_{RP2}$: optical path length from the fiber coupler 13 to the second reference surface RP2;

$d_{O1}$: optical path length from the leading end of the first measurement head H1 to the measurement object O1; and $d_{O2}$: optical path length from the leading end of the second measurement head H2 to the measurement object O2.

In FIG. 3A, an optical path length M1 of the first return light L31 is represented by $$M1=d_c+D1+d_{O1}+d_{O1}+(D1-d_{RP1}),$$

an optical path length S1 of the first reference light 41 is represented by $$S1=d_c+d_{RP1}, \text{ and}$$

a difference $\Delta d1$ in optical path length between the first return light L31 and the first reference light L41 is represented by $$\Delta d1 = M1-S1 = 2\chi(D1+d_{O1}-d_{RP1}).$$

Similarly, in FIG. 3B, an optical path length M2 of the second return light L32 is represented by $$M2=d_c+D2+d_{O2}+d_{O2}+(D2-d_{RP2}),$$

an optical path length S2 of the second reference light L42 is represented by $$S2=d_c+d_{RP2}, \text{ and}$$

a difference $\Delta d2$ in optical path length between the second return light L32 and the second reference light L42 is represented by $$\Delta d2 = M2 - S2 = 2 \times (D2 + d_{O2} - d_{RP2}).$$

Since the measurement range of the first measurement head H1 is 0 to R1 max, the minimum value and the maximum value of the difference in optical path length $\Delta d1$ are represented by $$\Delta d1\ \min = 2 \times (D1 - d_{RP1})$$

$$\Delta d1\ \max = 2 \times (D1 + R1\ \max - d_{RP1}).$$

Similarly, the minimum value and the maximum value of the difference in optical path length $\Delta d2$ are represented by, respectively, $$\Delta d2\ \min = 2 \times (D2 - d_{RP2})$$

$$\Delta d2\ \max = 2 \times (D2 + R2\ \max - d_{RP2}).$$

Since the frequency of the interference signal L5 (beat frequency) is proportional to the difference in optical path length between the return light and the reference light, when the proportional constant is denoted by k, the frequencies f11, f12, f21, and f22 in FIG. 2A can be represented as follows:

$$f11 = 2 \times k \times (D1 - d_{RP1})$$

$$f12 = 2 \times k \times (D1 + R1\ \max - d_{RP1})$$

$$f21 = 2 \times k \times (D2 - d_{RP2})$$

$$f22 = 2 \times k \times (D2 + R2\ \max - d_{RP2})$$

Here, when $$S1 = d_c + d_{RP1}$$

$$S2 = d_c + d_{RP2}$$

are substituted into relational expression (1) and the expression is arranged, $$D1 + R1\ \max - dRP1 < D2 - d_{RP2},$$

it can be seen that f12<f21 according to expression (2) holds.

When expression (2) holds, as shown in FIG. 2A, the first frequency range f11 to f12 corresponding to the measurement range of the first measurement head H1 and the second frequency range f21 to f22 corresponding to the measurement range of the second measurement head H2 are completely separated from each other. Accordingly, the ranging result of the plurality of the measurement heads, that are H1 and H2, can be extracted from the frequency spectrum of the one interference signal L5.

Comparative Example

In contrast to the above described derivation, if the relational expression (1) is not satisfied, e.g., f12≥f21 holds, as shown in the comparative example in FIG. 2B, the frequency range corresponding to the measurement range of the first measurement head H1 and the frequency range corresponding to the measurement range of the second measurement head H2 overlap with each other. As such, if a peak appears between f21 and f12 as shown in FIG. 2B, a problem occurs in that, it is not possible to determine the measurement head of which the peak represents the measurement result, and synchronous measurement using the multiple heads cannot be realized.

Advantages

According to the above-described configuration, the plurality of measurement heads, that are H1 and H2, can share the configuration upstream of the fiber coupler 13. In other words, a set of signal processing system (detector 15, A/D converter 17, and processing unit 16) makes it possible to perform multi-channel measurement using the plurality of measurement heads, that are H1 and H2. Also, since the frequencies of the signals in the channels can be easily separated by devising the setting of the optical path length, the configurations of the signal processing system are simplified. Accordingly, compared with conventional apparatuses which requires a signal processing system for each channel, a compact and low-cost multi-channel optical interference measurement apparatus can be realized.

Note that in order to increase the number of channels (heads), an N-branch (N>2) fiber coupler 13 may be used, or the measurement head may be added by branching the optical path into three or more by cascade-connecting fiber couplers 13. In the above described case, if the optical path length relating to the ith measurement system and the optical path length relating to the (i+1)th measurement system are set such that the relation of expression (1) is satisfied (e.g., the variables in expression (1) relating to the measurement system of the first measurement head is replaced with that of the ith measurement system, and the variables relating to the measurement system of the second measurement head is replaced with that of the (i+1)th measurement system), the frequencies of all the channels can be separated.

Incidentally, as shown in FIG. 1, FIG. 3A, and FIG. 3B, in a configuration in which the reference surfaces RP1 and RP2 are provided on the optical paths for guiding the measurement lights L11 and L12 to the measurement heads H1 and H2, respectively, expression (1) can be arranged as the following expression (1').

$$D1' + R1\ \max < D2' \qquad (1')$$

Here, D1' denotes the optical path length from the first reference surface RP1 to the leading end of the first measurement head H1, and D2' denotes the optical path length from the second reference surface RP2 to the leading end of the second measurement head H2.

Hereinafter, specific configuration examples of the optical interference measurement apparatus 1 will be illustrated. In the drawings of the configuration examples, parts corresponding to the basic configuration in FIG. 1 are given the same reference numerals.

First Embodiment

Figure 4:
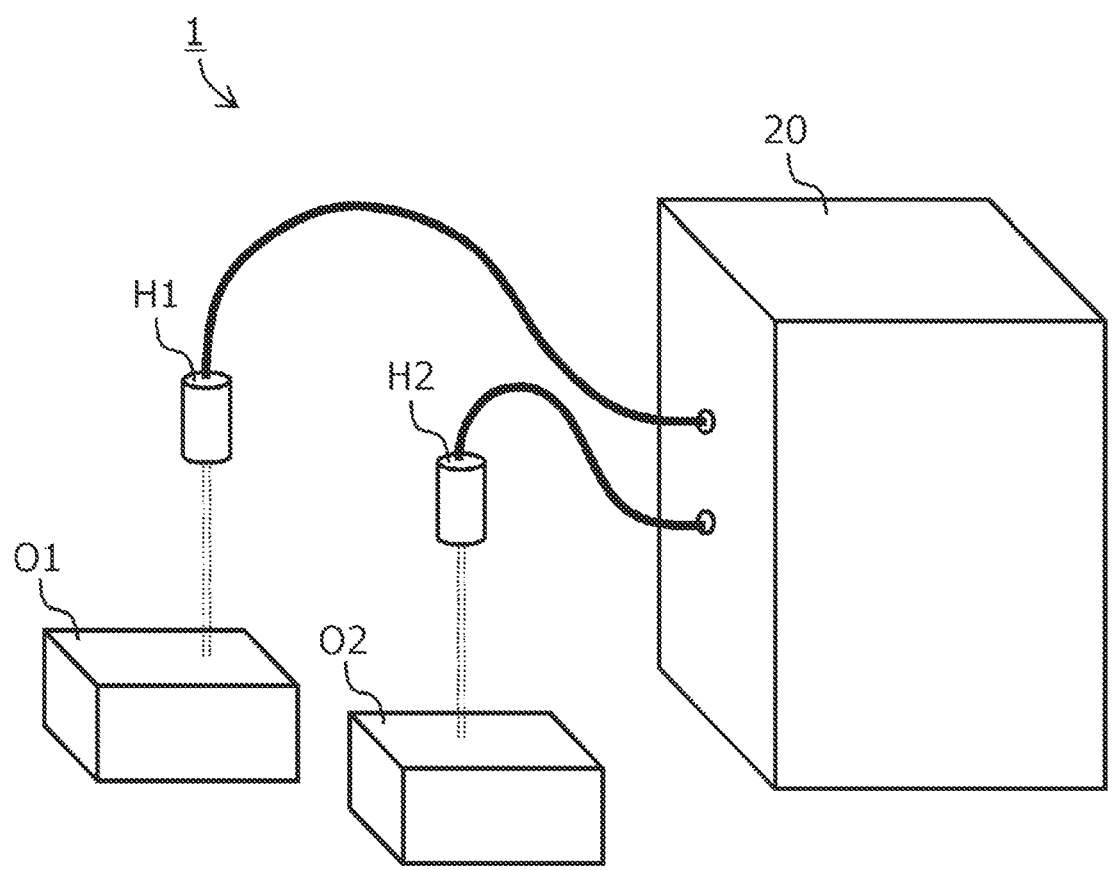
FIG. 4 is a schematic diagram illustrating an outer appearance of an optical interference measurement apparatus in accordance with one or more embodiments.
Figure 5:
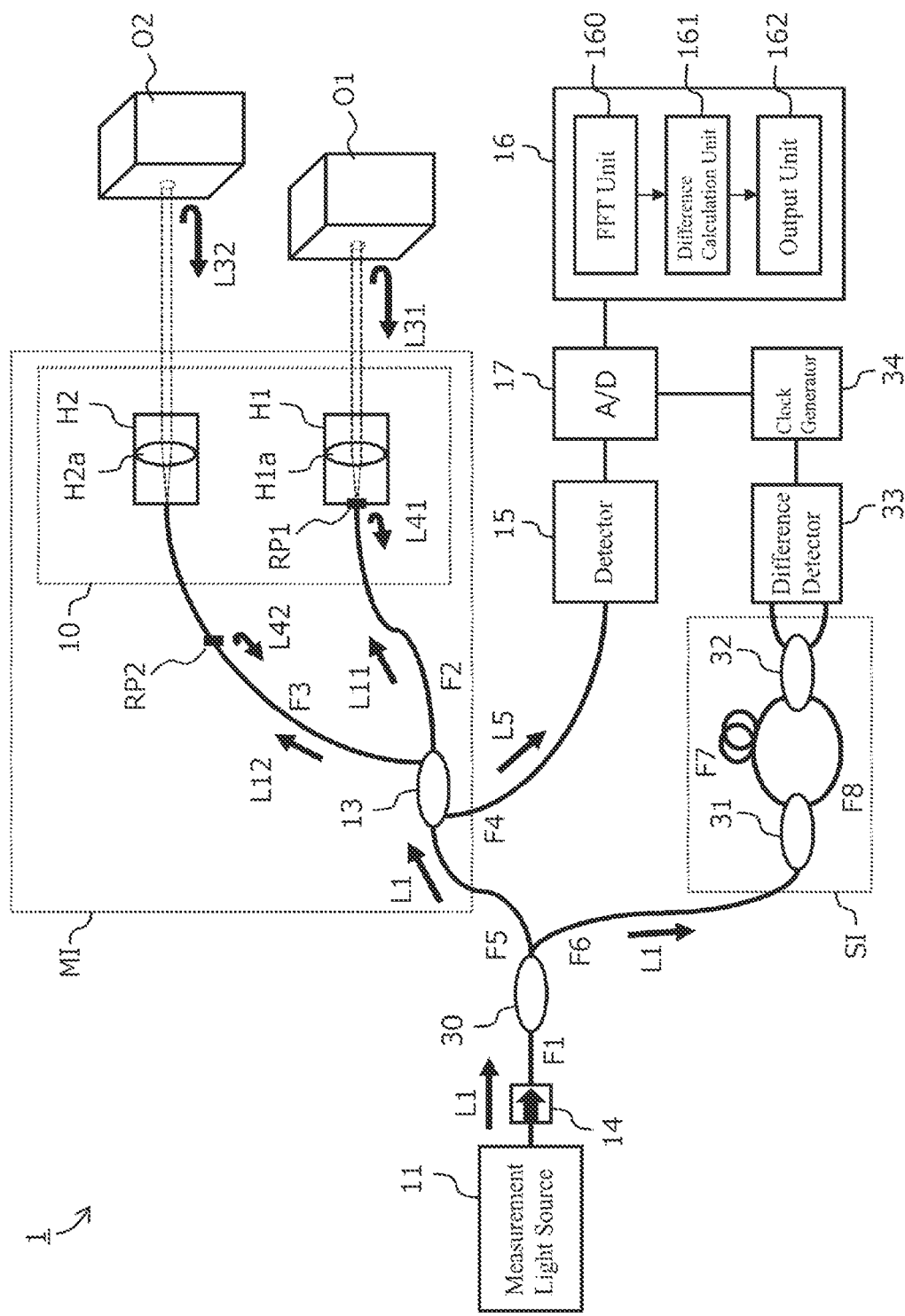
FIG. 5 is a schematic diagram illustrating a configuration of an optical interference measurement apparatus according to a first embodiment.

Now, the configuration of an optical interference measurement apparatus according to a first embodiment will be described with reference to FIG. 4 and FIG. 5. FIG. 4 is a schematic diagram illustrating the outer appearance of the optical interference measurement apparatus, and FIG. 5 is a schematic diagram illustrating the configuration of the optical interference measurement apparatus.

The optical interference measurement apparatus 1 of a present embodiment is an apparatus for ranging the measurement objects O1 and O2 by using a coherent FMCW (Frequency Modulated Continuous Wave). The optical interference measurement apparatus 1 generally includes a controller (apparatus main body) 20 and a plurality of measurement heads H1 and H2, and irradiation with the measurement light and reception of the reflecting light are performed at the leading ends of the measurement heads H1 and H2. The measurement heads H1 and H2 are collectively called "measurement unit 10". The controller 20 is constituted mainly including the measurement light source 11 for outputting the measurement light L1, the fiber coupler 13, the optical isolator 14, the detector 15, the processing unit 16, the A/D converter 17, fiber couplers 30 to 32, a difference detector 33, a clock generator 34, and the optical fibers F1 to F8.

A Fizeau main interferometer M1 is constituted by the fiber coupler 13, the measurement unit 10 and the optical fibers F2 and F3, and a subordinate interferometer S1 is constituted by the fiber couplers 31 and 32, and the optical fibers F7 and F8. The main interferometer M1 is an interferometer for measurement, and the sub interferometer S1 is an interferometer for correcting the characteristics of the measurement light source 11.

The measurement light source 11 is a light source that is capable of outputting coherent measurement light L1, and uses a wavelength swept light source that is capable of temporally sweeping the wavelength of the measurement light L1 for the FMCW. Examples of the wavelength swept light source include a current modulation VCSEL, a MEMS-driven VCSEL and SSG-DBR, and the like, and any type of light source may be used. In the present embodiment, a current modulation VCSEL is used due to the advantage that it is low-cost. A near infrared laser having a wavelength of 1310 to 1550 nm is used as the measurement light L1, for example. Furthermore, although the wavelength sweeping is performed using a triangular wave in the present embodiment, the wavelength sweeping may also be performed using a sine wave, a sawtooth wave, or another waveform.

The optical isolator 14 is a device that allows light to pass through only in one direction. By the optical isolator 14 preventing light (return light or interference signal) from entering to the measurement light source 11 from the main interferometer M1, noise can be suppressed, and measurement accuracy can be improved.

The fiber coupler 30 is a single mode fiber coupler having one input and two outputs. The measurement light L1 that is input via the optical fiber F1 is branched by the fiber coupler 30, and the resultant light beams are respectively guided to the main interferometer M1 via the optical fiber F5, and to the subordinate interferometer S1 via the optical fiber F6.

The fiber coupler 13 is a single mode fiber coupler having two inputs and two outputs and a coupling ratio of 50%. The measurement light L1 input via the optical fiber F5 is branched into the first measurement light L11 and the second measurement light L12 at the fiber coupler 13, and the first measurement light L11 is guided to the first measurement head H1 via the optical fiber F2, and the second measurement light L12 is guided to the second measurement head H2 via the optical fiber F3. Furthermore, the interference signal that is input via the optical fiber F2 and the interference signal that is input via the optical fiber F3 are combined with each other by the fiber coupler 13, and the interference signal L5 is guided to the detector 15 via the optical fiber F4. Note that due to the structure of the fiber coupler, the interference signal is output to the optical fiber F5, but since the light is prevented from entering to the measurement light source 11 by the optical isolator 14, there is no problem in particular.

The first measurement head H1 is a unit for performing irradiation of the measurement object O1 with the first measurement light L11, and reception of the light reflected from the measurement object O1. The first measurement head H1 has a structure in which an optical system H1a is provided inside a lens barrel shaped like a cylinder having a diameter of approximately 1.5 cm and a length of approximately 3 cm or a rectangular tube, for example. The optical system H1a may also be a collimated lens for projecting a parallel beam, or a light-collecting lens for converging the beam at the measurement position on the measurement object O1.

The first reference surface RP1 is provided on an optical path between the fiber coupler 13 and the first measurement head H1. In the present embodiment, the first reference surface RP1 is formed at the connection part of the optical fiber F2 and the first measurement head H1. The first reference surface RP1 is a structure for forming the first reference light L41 by reflecting part of the first measurement light L11. With this configuration, since the optical path of the first reference light L41 and the first return light L31 can be formed by the same optical fiber F2, the influence of temperature changes or oscillations can be offset, and thus robustness can be improved.

If the amount of the first reference light L41 is large, the signal-to-noise (SN) ratio becomes worse due to noise that increases in accordance with the amount of signals, such as shot noise. Therefore, the reflectance ratio of the first reference surface RP1 is preferably less than 50%, and more preferably 10% or less. The method of forming the first reference surface RP1 is not particularly limited. The first reference surface RP1 may also be formed by, for example, vapor deposition of a partially reflective mirror on the end face of the optical fiber F2. Alternatively, the end surface of the optical fiber F2 may be set to a flat surface that is perpendicular to the optical axis, an air layer or a region filled with a refractive index matching material is formed between the optical fiber F2 and the first measurement head H1, and Fresnel reflection that occurs on the boundary face of the refractive index may also be used. Alternatively, reflection on the lens surface in the optical system H1a of the measurement head H1 may also be used.

The first return light L31 that is reflected from the measurement object O1 and received by the first measurement head H1 and the first reference light L41 that is reflected from the first reference surface RP1 have a phase difference that corresponds to twice the optical path length from the first reference surface RP1 to the measurement object O1. For this reason, the first return light L31 and the first reference light L41 interfere with each other on the first reference surface RP1, and an interference signal (beat signal) having a frequency component corresponding to the phase difference is generated.

The second measurement head H2 is a unit for performing irradiation of the measurement object O2 with the second measurement light L12 and reception of the light that is reflected from the measurement object O2. The second measurement head H2 has a structure in which an optical system H2a is provided inside a lens barrel shaped like a cylinder having a diameter of approximately 1.5 cm and a length of approximately 3 cm or a rectangular tube, for example. The structure of the second measurement head H2 may be the same as or different from the first measurement head H1.

The second reference surface RP2 is provided at an intermediate portion on the optical path between the fiber coupler 13 and the second measurement head H2. The second reference surface RP2 is a structure for reflecting part of the second measurement light L12 to form the second reference light L42. With this configuration, since the optical paths of the second reference light L42 and the second return light L32 can be formed by the same optical fiber F3, the influence of temperature changes or oscillations can be offset, and thus robustness can be improved.

The second return light L32 that is reflected from the measurement object O2 and received by the second measurement head H2 and the second reference light L42 that is reflected from the second reference surface RP2 have a phase difference that corresponds to twice the optical path length from the second reference surface RP2 to the measurement object O2. For this reason, the second return light L32 and the second reference light L42 interfere with each other on the second reference surface RP2, and an interference signal (beat signal) having a frequency component corresponding to the phase difference is generated. The interference signal on the first measurement head H1 side and the interference signal on the second measurement head H2 side are combined with each other in the fiber coupler 13, and is guided to the detector 15 as the interference signal L5.

Here, the optical path length D1 from the fiber coupler 13 to the leading end of the first measurement head H1, the optical path length D2 from the fiber coupler 13 to the leading end of the second measurement head H2, the maximum optical path length R1 max of the measurement range of the first measurement head H1, the optical path length S1 of the first reference light L41, and the optical path length S2 of the second reference light L42 are set such that the above relational expression (1) is satisfied.

Figure 6:
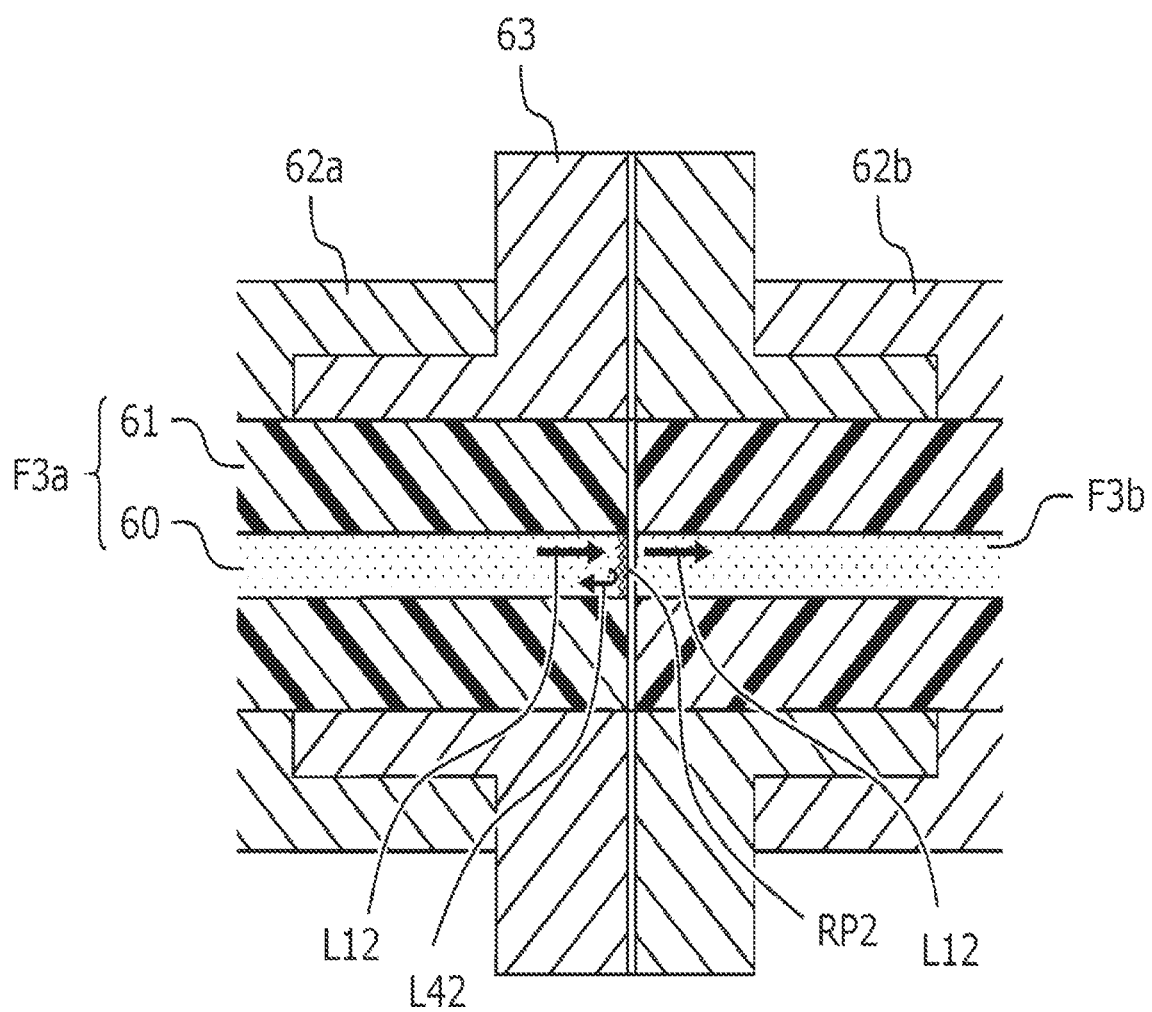
FIG. 6 is a diagram illustrating a cross-sectional view of a coupling part of an optical fiber at which a second reference surface is formed.

Here, a configuration example of the second reference surface RP2 will be illustrated with reference to FIG. 6, which is a cross-sectional view of the coupling part of the optical fiber at which the second reference surface RP2 is formed. In the present example, the optical path (F3) between the fiber coupler 13 and the second measurement head H2 is formed by coupling the two optical fibers, and the second reference surface RP2 is formed at the coupling part. In FIG. 6, signs F3a and F3b denote the optical fibers, 60 denotes a core, 61 denotes a clad, 62a and 62b denote fiber connectors, and 63 denotes an adaptor.

The two optical fibers F3a and F3b are coupled to each other by attaching the fiber connectors 62a and 62b that are attached at the end portions thereof to the adaptor 63. Here, a partially reflective mirror is formed by vapor deposition on the end face of the core 60 of the first optical fiber F3a on the fiber coupler 13 side. With this, part of the second measurement light L12 is reflected from the end face of the first optical fiber F3a and becomes the second reference light L42. If the amount of the second reference light L42 is large, the SN ratio becomes worse due to noise that increases in accordance with the amount of signals, such as shot noise. Therefore, the reflectance ratio of the second reference surface RP2 is preferably less than 50%, and more preferably, 10% or less.

The method for forming the second reference surface RP2 is not particularly limited. For example, a configuration is also possible in which the end face of the optical fiber F3a is set to a flat surface perpendicular to the optical axis, an air layer or a region in which a refractive index matching material is filled is formed between the optical fiber F3a and the optical fiber F3b, and Fresnel reflection that occurs on the boundary face of the refractive index is used. The detector 15 is photoelectric conversion element for converting the interference signal L5 that is input by the optical fiber F4 to an electric signal. The detector 15 is formed by a photodiode, an I-V conversion circuit, a signal amplifier, a filter circuit, and the like. The A/D converter 17 converts the electric signal obtained by the detector 15 to a digital signal. Sampling is performed by the A/D converter 17 in accordance with the clock signals supplied from the clock generator 34.

The processing unit 16 is a unit that performs frequency analysis on the interference signal thus A/D-converted, and calculates the distance, speed, and oscillation (hereinafter collectively called "distance information") of the measurement objects O1 and O2. The processing unit 16 includes an FFT (Fast Fourier Transformation) unit 160, a distance calculation unit 161, and an output unit 162 as the main functions. The FFT unit 160 has a function of performing Fourier transformation on the interference signal L5 to obtain the frequency spectrum, the distance calculation unit 161 has a function of calculating the distance information based on the frequency of the peak of the frequency spectrum, and the output unit 162 has a function of outputting the result of calculation. Although not shown in the figures, the information such as distance, speed, and oscillation, which is the result of calculation by the processing unit 16, is output to an external device (e.g., PLC (Programmable Logic Controller), a robot, an inspection device, and a host computer) and used for controlling FA equipment, various inspections, and the like.

The processing unit 16 is constituted by, for example, a calculation processing device provided with a processor and a memory. A general-purpose processor such as a CPU (Central Processing Unit) or an MPU (Micro Processing Unit), or a dedicated processor such as an FPGA (Field-Programmable Gate Array) or an ASIC (Application Specific Integrated Circuit) may also be used as a processor.

The fiber couplers 31 and 32 are single mode fiber couplers having a coupling ratio of 50%. A subordinate interferometer S1 is constituted by providing a predetermined difference in optical path length between the optical fiber F7 and the optical fiber F8. The measurement light L1 that is input to the subordinate interferometer S1 from the optical fiber F6 is branched by the fiber coupler 31, and thereafter the resultant light beams are combined with each other by the fiber coupler 32. At this time, the light that passes through the optical fiber F7 and the light that passes through the optical fiber F8 interfere with each other in the fiber coupler 32, and signals, in which the interference signals in the opposite phases are respectively superimposed on a triangular wave, are output from two output port of the fiber coupler 32. A difference detector 33 (also called a "balanced photodetector") converts the signals output by the subordinate interferometer S1 to electric signals, and outputs the difference between the two signals. With this operation, the triangular wave and laser noise between the two signals offset each other, the interference signal component is amplified, and thus the interference signal having a good SN ratio can be obtained. The clock generator 34 is a circuit that generates a clock signal from a zero-crossing time of the interference signal obtained by the difference detector 33.

In one or more embodiments, it is ideal that change (inclination) in the wavelength over time is linear when sweeping the wavelength of the measurement light by the measurement light source 11. Wavelength sweeping linearity is important because if the wavelength sweeping is not linear, the beat frequency of the interference signal is not constant, which deteriorates ranging accuracy. However, in actuality, it is difficult to linearly sweep the wavelength. Also, the degree to which the wavelength is separated from linear shape depends on the individual characteristics of the measurement light source, and therefore it is difficult to correct the wavelength in advance.

In view of the above described and other issues, in the present embodiment, in order to correct the non-linearity of the wavelength sweeping of the measurement light source 11, a sampling clock of the A/D converter 17 is generated by using the subordinate interferometer S1. Since the sampling clock is generated from the measurement light that was actually output from the measurement light source 11, the sampling clock is formed by clock signals at unequal intervals in accordance with the inclination of the wavelength sweeping of the measurement light. By sampling the interference signals of the main interferometer M1 at unequal intervals using this sampling clock, a result that is equivalent to that of sampling at equal interval phases can be obtained. Accordingly, reliability of frequency analysis and ranging accuracy can be improved.

Note that, another method for correcting non-linearity of the wavelength sweeping may also be used. For example, the interference signals at equal interval phases may also be generated by the processing unit 16 by estimating the inclination (non-linearity) of the wavelength sweeping, based on the interference signals of the subordinate interference signal S1, and interpolating the interference signals of the main interferometer M1 that are sampled at equal intervals by the A/D converter 17. Alternatively, the linearity of the measurement light that is output from the measurement light source 11 may also be ensured by giving the distortion in the opposite direction to the control signal for sweeping the wavelength of the measurement light source 11 in advance such that the control signal and the light source characteristics offset each other.

Figure 7:
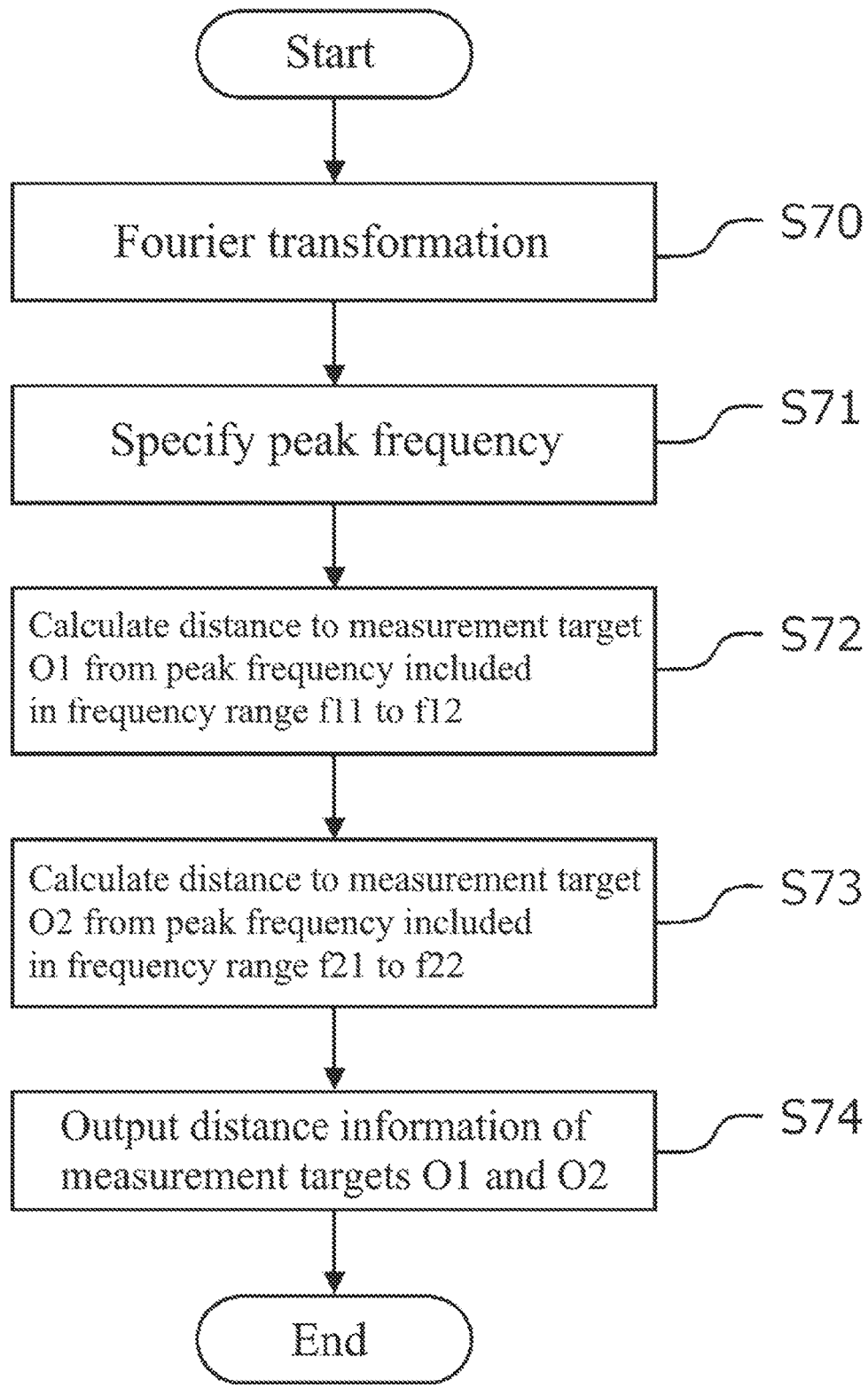
FIG. 7 is a diagram illustrating a flowchart of an example of calculation processing performed by a processing unit.

FIG. 7 is a flowchart illustrating an example of calculation processing performed by a processing unit 16. The calculation processing in FIG. 7 is executed whenever the interference signal L5 for each measurement is received.

In step S70, the FFT unit 160 performs Fourier transformation on the interference signal and obtains the frequency spectrum. As shown in an example of FIG. 2A, the peaks appear in the frequencies corresponding to the distance to the measurement object O1 and the measurement object O2 in the frequency spectrum (if there is no measurement object, no peak appears).

In step S71, the distance calculation unit 161 detects the peaks of the spectrum, and specifies the frequency of the peaks. The distance calculation unit 161 may also detect, as the peak frequency, the frequency in which the intensity of the spectrum exceeds a predetermined threshold value, for example. Note that, any method can be used for detecting the peaks and specifying the peak frequency.

In step S72, the distance calculation unit 161 calculates the distance to the measurement object O1, based on the peak frequency included in the first frequency range f11 to f12 corresponding to the measurement range of the first measurement head H1. Also, in step S73, the distance calculation unit 161 calculates the distance to the measurement object O2, based on the peak frequency included in the second frequency range f21 to f22 corresponding to the measurement range of the second measurement head H2. The distance calculation unit 161 may have two kinds of the functions or LUTs (Look-up Table) for frequency-distance conversion, each for the first measurement head H1 and the second measurement head H2, and switch the function or LUT to be used for calculation, in accordance with the frequency range in which the peak appears.

In step S74, the output unit 162 outputs the distance information regarding the measurement objects O1 and O2 calculated by the distance calculation unit 161.

According to the above-described configuration, compared with conventional apparatuses which require a signal processing system for each channel, a compact and low-cost multi-channel optical interference measurement apparatus can be realized.

Second Embodiment

Figure 8:
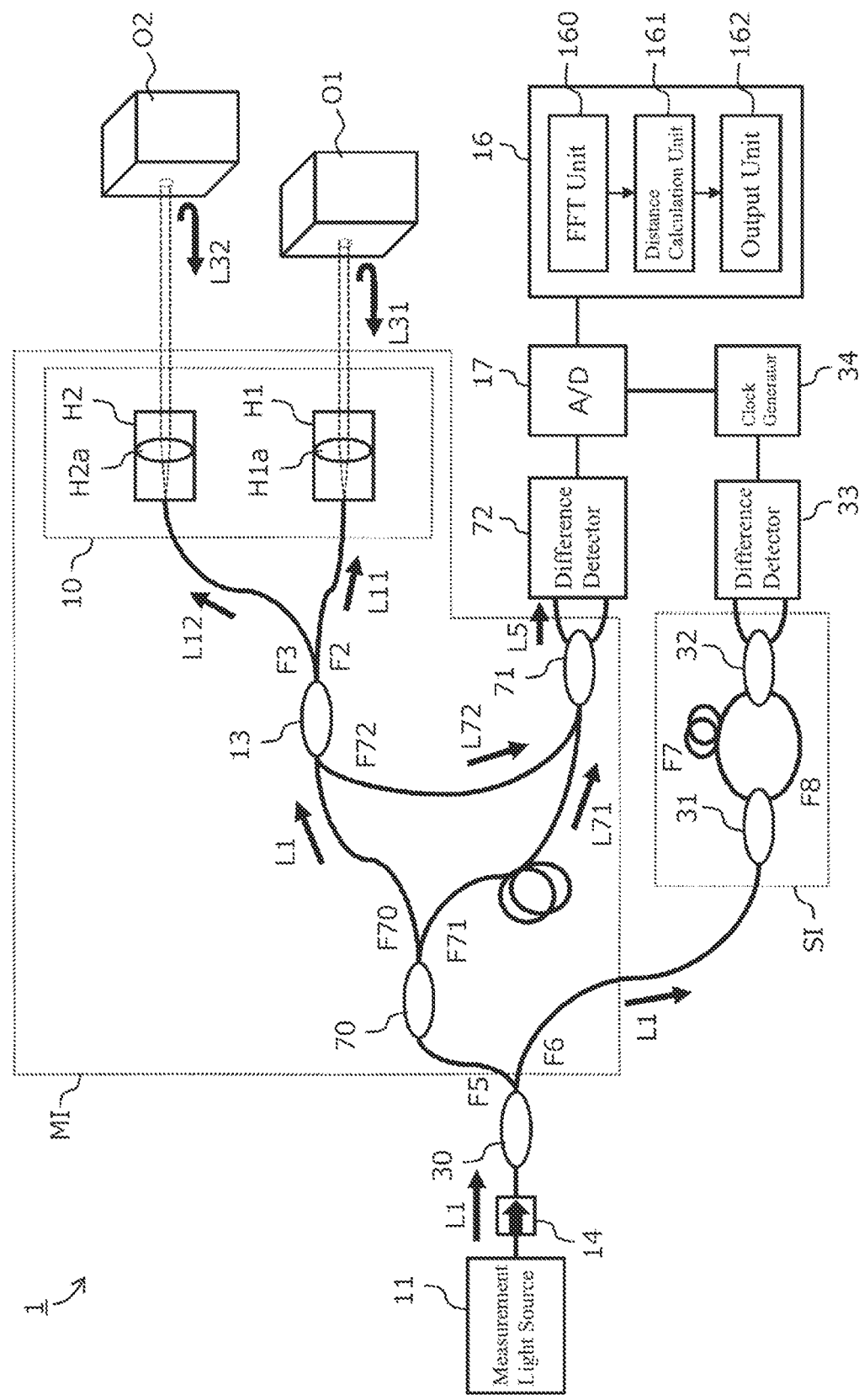
FIG. 8 is a schematic diagram illustrating a configuration of an optical interference measurement apparatus according to a second embodiment.

FIG. 8 shows the configuration of an optical interference measurement apparatus according to the second embodiment. The second embodiment is different from the above configuration example in that a Mach-Zehnder interferometer is used as the main interferometer M1.

The main interferometer M1 includes fiber couplers 70, 13, and 71, optical fibers F2, F3, F70 to F72, the first measurement head H1, and the second measurement head H2. The main interferometer M1 also includes a difference detector 72 instead of the detector 15 of the above configuration example.

The measurement light L1 that is input via the optical fiber F5 is branched by the fiber coupler 70 (branching device), and the resultant light beams are guided to the optical fibers F70 and F71, respectively. The measurement light L1 that is branched into the optical fiber F70 is further branched by the fiber coupler 13, and the resultant light beams are guided to the first measurement head H1 and the second measurement head H2, and projected on the measurement objects O1 and O2 respectively. The first return light L31 that is reflected from the measurement object O1 and the second return light L32 that is reflected from the measurement object O2 are combined with each other by the fiber coupler 13 and the return light L72 thus combined is input to the fiber coupler 71 via the optical fiber F72. On the other hand, the measurement light that is branched by the fiber coupler 70 into the optical fiber F71 is input to the fiber coupler 71 as reference light L71. Thereafter, the return light L72 and the reference light L71 interfere with each other in the fiber coupler 71, and the signals L5 in which the interference signals in the opposite phases are superimposed on the triangular wave are output from the two output ports of the fiber coupler 71. The difference detector 72 converts the signals L5 that are output from the main interferometer M1 into the electric signals, and outputs the difference between the two signals. With this operation, an interference signal having a good SN ratio can be obtained.

In the configuration of the present embodiment, the reference light L71 functions as both the first reference light that interferes with the first return light L31 and the second reference light that interferes with the second return light L32. In other words, the optical path of the first reference light and the optical path of the second reference light can be considered as the same. Accordingly, the optical path length S1 of the first reference light and the optical path length S2 of the second reference light in the relational expression (1) have the relation S1=S2, and as a result, the expression (1) can be organized as expression (1") as follows:

$$D1+R1\ max<D2 \qquad (1")$$

By setting the optical path length D1 from the fiber coupler 13 to the leading end of the first measurement head H1 and the optical path length D2 from the fiber coupler 13 to the leading end of the second measurement head H2 such that expression (1") is satisfied, a multi-channel optical interference measurement apparatus can be realized with small size and at low cost.

Third Embodiment

Figure 9:
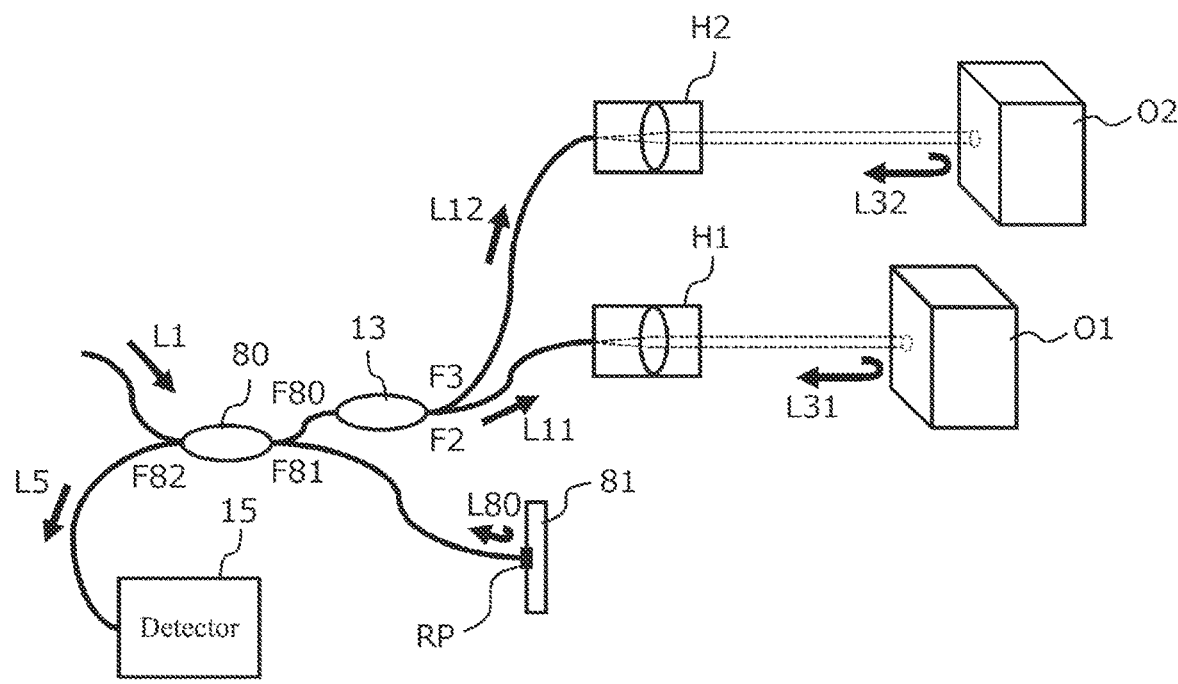
FIG. 9 is a schematic diagram illustrating a configuration of an optical interference measurement apparatus according to a third embodiment.

FIG. 9 shows a relevant portion of an optical interference measurement apparatus according to a third embodiment, which may be different from the above configuration examples in that a Michaelson interferometer may be used as the main interferometer M1.

In the configuration example of a third embodiment, the measurement light L1 is branched by a fiber coupler 80 and the resultant light beams are guided to optical fibers F80 and F81, respectively. The measurement light L1 that is branched into the optical fiber F80 is further branched by the fiber coupler 13, and the resultant light beams are guided to the first measurement head H1 and the second measurement head H2, and projected on the measurement objects O1 and O2, respectively. The first return light L31 that is reflected from the measurement object O1 and the second return light L32 that is reflected from the measurement object O2 combine with each other by the fiber coupler 13, and the return light thus combined is input to the fiber coupler 80 via the optical fiber F80. On the other hand, the measurement light that is branched by the fiber coupler 80 into the optical fiber F81 is reflected from the reflector 81 (reference surface RP) and is input to the fiber coupler 80 as reference light L80. Thereafter, the return light and the reference light L80 interfere with each other in the fiber coupler 80, and the interference signal L5 is guided to the detector 15 via the optical fiber F82. The subsequent processing is the same as the above configuration examples.

In the configuration of the present embodiment, the reference light L80 functions as both the first reference light that interferes with the first return light L31 and the second reference light that interferes with the second return light L32. In other words, the optical paths of the first reference light and the second reference light can be considered as the same. Accordingly, in the present embodiment as well, by setting the optical path length D1 from the fiber coupler 13 to the leading end of the first measurement head H1 and the optical path length D2 from the fiber coupler 13 to the leading end of the second measurement head H2 such that the expression (1") is satisfied, a multi-channel optical interference measurement apparatus can be realized in small size and at low cost.

Fourth Embodiment

Figure 10:
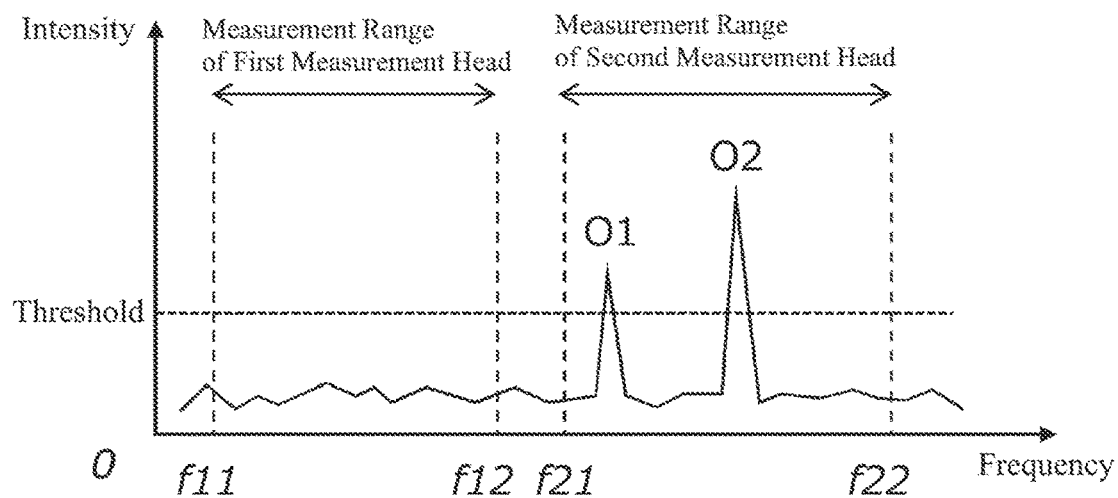
FIG. 10 is a diagram illustrating an example of a state where two peaks appear in a frequency range corresponding to a measurement range of a second measurement head.

If the measurement object O1 is located at a position out of the measurement range of the first measurement head H1, logically, as shown in FIG. 10, the peak corresponding to the measurement object O1 may appear within the second frequency range f21 to f22 (in actuality, the longer the distance to the measurement object O1 is, the worse SN ratio of the return light is, and thus the peak does not exceed the predetermined threshold value, and there is no problem in many cases). If there are two peaks within the second frequency range f21 to f22, it cannot be determined which peak is that of the measurement object O2. In view of this, in a fourth embodiment, a configuration is adopted in which an error is output when there are two peaks within the second frequency range f21 to f22. Note that there is no possibility that the peak corresponding to the measurement object O2 appears within the first frequency range f11 to f12 (because the distance between the second measurement head H2 and the measurement object O2 will not be minus due to a physical restriction), a case where there are two peaks within the first frequency range f11 to f12 need not be considered.

Figure 11:
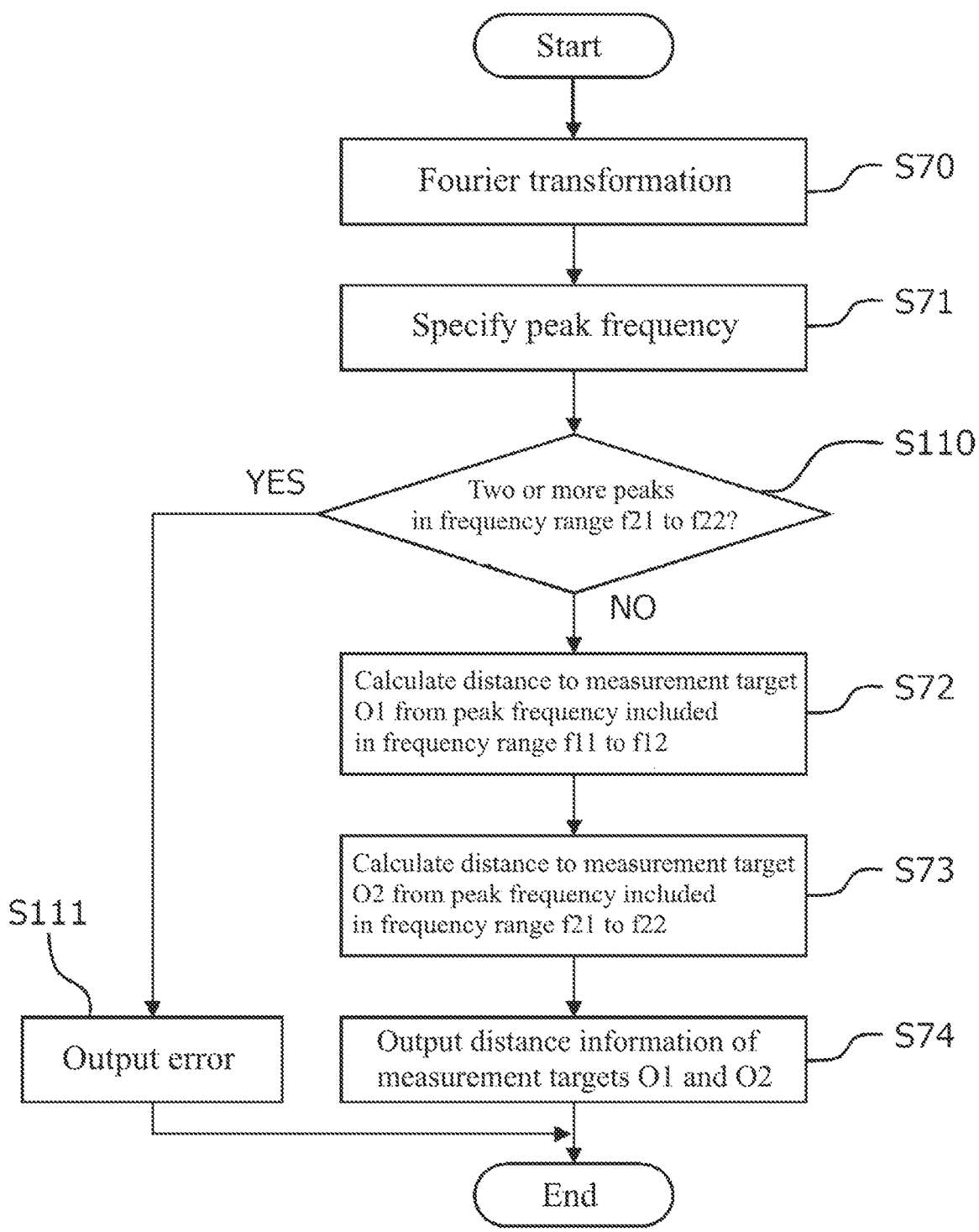
FIG. 11 is a flowchart illustrating an example of calculation processing performed by a processing unit according to a fourth embodiment.

FIG. 11 is a flowchart of the calculation processing performed by a processing unit 16 according to the fourth embodiment. Processing common to the flowchart in FIG. 7 is given the same step number. In the present embodiment, after detecting the peak in step S71, in step S110, the distance calculation unit 161 checks whether there are two or more peaks within the second frequency range f21 to f22. If there are one or less peak, similarly to the calculation processing in FIG. 7, the distance calculation unit 161 executes processing in steps S72 to S74. If there are two or more peaks within the second frequency range f21 to f22, the output unit 162 outputs an alert indicating a measurement error (step S111), and ends the processing.

With a configuration described in connection with a present embodiment, since output of an erroneous measurement result can be prevented, reliability of the optical interference measurement apparatus 1 can be improved.

Further Considerations

The above described embodiments are merely exemplifications of configuration examples of the invention, which is not limited to the specific embodiments described above, and various modifications are possible within the technical scope thereof. For example, the above configurations of a first to a fourth embodiment may also be expanded to configurations in which there are three or more measurement heads.

Note 1

An optical interference measurement apparatus including:
a light source that is configured to output measurement light;
a measurement unit that emits the measurement light and to receive return light that is reflected from a measurement object;
a detector that is configured to receive an interference signal of the return light and reference light and to convert the interference signal into an electric signal; and
a processing unit that is configured to obtain information relating to a distance, a speed, or an oscillation of the measurement object, based on the electric signal, wherein
a fiber coupler that branches the measurement light from the light source is provided on an optical path between the light source and the measurement unit,
the measurement unit includes a first measurement head to which a first measurement light branched from the fiber coupler is input via a first optical path, and a second measurement head to which a second measurement light branched from the fiber coupler is input via a second optical path,
a first return light that is received by the first measurement head is guided to the detector via the first optical path and the fiber coupler,
a second return light that is received by the second measurement head is guided to the detector via the second optical path and the fiber coupler,
the optical path length D1 from the fiber coupler to the leading end of the first measurement head, the optical path length D2 from the fiber coupler to the leading end of the second measurement head, the maximum optical path length R1 max of the measurement range of the first measurement head, the optical path length S1 of the first reference light that interferes with the first return light, and the optical path length S2 of the second reference light that interferes with the second return light are set such that the relation $D1+R1\ max-S1<D2-S2$ is satisfied.

The invention claimed is:
1. An optical interference measurement apparatus comprising:
a light source that outputs measurement light;
a measurement unit that emits the measurement light and receives return light that is reflected from a first measurement object and a second measurement object;
a first reference surface;

a second reference surface;

a detector that receives an interference signal of the return light and reference light and converts the interference signal into an electric signal; and a processing unit that obtains first information relating to a distance, a speed, or an oscillation of the first measurement object and second information relating to a distance, a speed, or an oscillation of the second measurement object, based on the electric signal, wherein a fiber coupler that branches the measurement light from the light source is provided on an optical path between the light source and the measurement unit, the measurement unit comprises a first measurement head to which a first measurement light for obtaining the first information of the first measurement object is branched from the fiber coupler is input via a first optical path, and a second measurement head to which a second measurement light for obtaining the second information of the second measurement object is branched from the fiber coupler is input via a second optical path, a first reference light that is reflected from the first reference surface positioned in a downstream direction toward the light source from a leading end of the first measurement head is guided to the first optical path the first reference surface formed at a connection part of the first optical path and the first measurement head, a second reference light that is reflected from the second reference surface positioned in the downstream direction from and spaced away from an input end of the second measurement head is guided to the second optical path, the second reference surface being provided at an intermediate portion on the second optical path between the fiber coupler and the input end of the second measurement head, a first return light that is received by the first measurement head is guided to the detector via the first optical path and the fiber coupler, a second return light that is received by the second measurement head is guided to the detector via the second optical path and the fiber coupler, an optical path length D1 from the fiber coupler to the leading end of the first measurement head, an optical path length D2 from the fiber coupler to a leading end of the second measurement head, a maximum optical path length R1 max of the measurement range of the first measurement head, an optical path length S1 of the first reference light from where the measurement light is emitted from the light source to the first reference surface where the first reference light is combined with and interferes with the first return light, and an optical path length S2 of the second reference light from where the measurement light is emitted from the light source to the second reference surface where the second reference light is combined with and interferes with the second return light are set such that the relation $$D1+R1\ max-S1<D2-S2$$

is satisfied, the second optical path is formed by coupling a first optical fiber and a second optical fiber, and the second reference surface is an end face on the second optical fiber side of the first optical fiber, which is spaced from the input end of the second measurement head, and the processing unit is further configured to calculate a first measurement distance of the first measurement object measured by the first measurement head based on a first frequency of a first peak that is present within a first frequency range based on the obtained first information, and calculate a second measurement distance of the second measurement object measured by the second measurement head based on a second frequency of a second peak that is present within a second frequency range that does not overlap with the first frequency range based on the obtained second information, and output an error if the first peak and the second peak are within the second frequency range.

2. The optical interference measurement apparatus according to claim 1, wherein the first reference light is part of the first measurement light that is reflected from the first reference surface provided on the first optical path;

the second reference light is part of the second measurement light that is reflected from the second reference surface provided on the second optical path; and an optical path length D1' from the first reference surface to the leading end of the first measurement head and an optical path length D2' from the second reference surface to the leading end of the second measurement head are set such that the relation $$D1'+R1\ max<D2'$$

is satisfied.

3. The optical interference measurement apparatus according to claim 2, wherein the first reference surface is arranged at a connection portion of the first optical path and the first measurement head.

4. The optical interference measurement apparatus according to claim 3, wherein the first reference surface is an end face on the first measurement head side of an optical fiber that forms the first optical path.

5. The optical interference measurement apparatus according to claim 2, wherein the second optical path is formed by coupling a first optical fiber and a second optical fiber, and the second reference surface is an end face on the second optical fiber side of the first optical fiber.

6. The optical interference measurement apparatus according to claim 1, wherein an optical path of the first reference light and an optical path of the second reference light are the same, and the optical path length D1 from the fiber coupler to the leading end of the first measurement head and the optical path length D2 from the fiber coupler to the leading end of the second measurement head are set such that the relation $$D1+R1\ max<D2$$

is satisfied.

7. The optical interference measurement apparatus according to claim 1, wherein an optical isolator that prevents light from entering to the light source is provided between the light source and the fiber coupler.

8. The optical interference measurement apparatus according to claim 2, wherein an optical isolator that prevents light from entering to the light source is provided between the light source and the fiber coupler.

9. The optical interference measurement apparatus according to claim 3, wherein
an optical isolator that prevents light from entering to the light source is provided between the light source and the fiber coupler.

10. The optical interference measurement apparatus according to claim 4, wherein
an optical isolator that prevents light from entering to the light source is provided between the light source and the fiber coupler.

* * * * *

UNITED STATES PATENT AND TRADEMARK OFFICE
CERTIFICATE OF CORRECTION

PATENT NO. : 12,306,343 B2  
APPLICATION NO. : 17/170942  
DATED : May 20, 2025  
INVENTOR(S) : Kazuya Kimura et al.

Page 1 of 1

It is certified that error appears in the above-identified patent and that said Letters Patent is hereby corrected as shown below:

On the Title Page

Item (74) Attorney, Agent, or Firm should read:  
METROLEX IP LAW GROUP, PLLC; Robert L. Scott, Esq Signed and Sealed this  
Twenty-fourth Day of June, 2025

Coke Morgan Stewart  
*Acting Director of the United States Patent and Trademark Office*